Patented Aug. 29, 1944

2,356,925

UNITED STATES PATENT OFFICE 2,356,925

POLYMERIZATION OF VINYL HALIDES

Charles F. Fryling, Silver Lake, Ohio, assignor to
The B. F. Goodrich Company, New York, N. Y.,
a corporation of New York No Drawing. Application March 28, 1941,
Serial No. 385,731

6 Claims. (Cl. 260—86)

This invention relates to the polymerization of vinyl halides such as vinyl chloride or vinyl bromide either alone or in admixture with other compounds polymerizable therewith and is particularly concerned with a new method for effecting such polymerizations. More specifically, this invention relates to a process of polymerizing vinyl halides in presence of inorganic compounds containing both sulfur and oxygen which normally function as reducing agents, and to the products thereby obtained.

It is well known that useful plastic polymers may be obtained on a commercial scale from vinyl halides only when the polymerization is effected in presence of a substance which materially increases or accelerates the rate of polymerization. Heretofore certain oxygen yielding compounds or oxidizing agents such as hydrogen peroxide, dibenzoyl peroxide, diacyl peroxides, potassium persulfate and sodium perborate have been employed for this purpose and such compounds have been referred to variously as "polymerization catalysts," "polymerization accelerators" or "polymerization promoters." However it now seems more nearly accurate to refer to these compounds as "polymerization initiators" since it is fairly certain that such compounds initiate the polymerization reaction by some chemical change and are themselves at least partially used up during the polymerization process. This terminology is particularly desirable since other types of compounds which exert a quite different action and which may also be present during the polymerization have been discovered and have generally been termed "polymerization accelerators" or "polymerization catalysts."

When polymerization of vinyl halides is effected in presence of the known polymerization initiators such as dibenzoyl peroxide, it is important that only very small amounts of the initiator be employed, otherwise low molecular weight soluble products are formed which are not nearly so valuable as are the high molecular weight relatively insoluble vinyl polymers. The regulation of the precise amount of the oxygen yielding initiator is not a simple problem, however, since atmospheric oxygen or other oxygen yielding compounds may inadvertently be present in the polymerization mixture, for example, soaps used in the emulsion polymerization process may contain an appreciable amount of peroxide. Hence it is often desirable to employ a polymerization initiator which is not also an oxidizing agent, but this has not heretofore been possible since all the known effective initiators are oxygen yielding compounds or oxidizing agents and workers in the art have come to believe that only oxidizing agents are capable of initiating the polymerization reaction.

I have now discovered, quite unexpectedly that inorganic compounds containing both sulfur and oxygen which normally function as reducing agents are also capable of initiating the polymerization of vinyl halides or monomer mixtures consisting predominantly of a vinyl halide. These new initiators are normally reducing agents since the sulfur atoms present in these compounds are in a lower state of valency, i. e., a valency of two or four, and therefore are readily converted or oxidized to a compound in which sulfur has its normal maximum valence of six. Included in this class of compounds are the lower oxides of sulfur, the oxyacids derived therefrom (the so-called "ous" acids of sulfur), and the salts, acid chlorides and other derivatives of these acids or oxides, for examples, sulfur monoxide —SO, sulfur dioxide —SO$_2$, sulfurous acid —H$_2$SO$_3$, thionyl chloride —SOCl$_2$ and the various sulfites, bisulphites, sulfoxylates, dithionites (hyposulfites) and the like. The preferred compounds in this class are sulfur dioxide, sulfurous acid, alkali metal and other water soluble sulfites such as sodium sulfite or bisulfites, water soluble sulphoxylates (hydrosulfites) and water soluble dithionites. The particular compound preferred will depend somewhat upon the conditions of polymerization as will be explained more fully hereinafter.

It is quite surprising that these compounds which have a low oxidation-reduction potential and are strong reducing agents should initiate the polymerization of vinyl halides since it has formerly been necessary to employ a compound which has a high oxidation-reduction potential and which is a strong oxidizing agent in order to effect a rapid polymerization. It is even more surprising that sulfur dioxide should be capable of initiating the linear polymerization of vinyl chloride to a high molecular weight thermoplastic polymer since it is ordinarily believed that sulfur dioxide condenses with vinyl chloride to form a heteropolymer.

As has been mentioned herinabove these new initiators of polymerization may be employed in the polymerization of any vinyl halide or in the polymerization of any mixture of polymerizable materials consisting predominantly of a vinyl halide. Thus, it is within the scope of this invention to polymerize vinyl chloride, vinyl bromide or a mixture of a vinyl halide with minor proportions of vinyl acetate, vinyl chloroacetate, vinyl formate, vinylidene chloride, vinyl cyanide, methyl vinyl ketone, methyl acrylate, methyl methacrylate, styrene or the like.

Any of the well known methods may be employed to carry out the poylmerization. Thus polymerization may be effected in a homogeneous system as by heating the monomeric material either with or without a solvent in the presence of one of the initiators of this invention, which in this case is preferably sulfur dioxide because sulfur dioxide is soluble in the monomers employed. However, it is preferred to conduct the polymerization in a heterogeneous system such as an aqueous emulsion. In this process the monomer or monomer mixture is emulsified in water with the aid of a suitable emulsifying agent such as partially or completely neutralized soaps of fatty acids or synthetic saponaceous materials; for example, sodium oleate, sodium myristate, "Aquarex D" a commercial product believed to consist largely of sodium lauryl sulfate, "Nekal AEM" a commercial product containing gelatin and sodium isopropyl naphthalene sulfonate, and the like, and polymerization is then effected by adding the initiator and agitating the emulsion until the polymer is formed.

The particular form of the initiator used in the emulsion polymerization process will depend somewhat upon the emulsifying agent present and the acidity of pH of the emulsion. If, for example, sulfur dioxide is employed as the initiator in the emulsion polymerization process, it may be present as sulfurous acid when the emulsion has a low pH, as an alkali bisulfite when the emulsion is of intermediate pH or as an alkali sulfite when the emulsion is of high pH. On the other hand the sulfur dioxide may remain in the non-aqueous phase of the emulsion throughout the process. Although it is preferred to add the initiator to the emulsion after it is formed this is not essential as it may be added either to the monomers or to the aqueous solution of emulsifying agent before emulsification occurs.

The initiators of this invention may be used in varying amounts depending upon the substances polymerized and the conditions for polymerization. For example, when sulfur dioxide is employed as the initiator for the polymerization of vinyl chloride in aqueous emulsion, it is desirable to employ from 0.1 to 2% of sulfur dioxide by weight based on the weight of the monomers polymerized. If soduim sulfite, sodium bisulfite, sulfurous acid or some other initiator disclosed hereinabove is substituted for the sulfur dioxide, equivalent proportions should be employed. Generally there is no particular advantage in using over 5% by weight of the initiator and amounts somewhat smaller than this are usually most desirable.

Any other substances which influence the course of the polymerization or which alter the properties of the polymers obtained may be present in the polymerization batch along with the initiators of this invention without destroying the action of either. Buffer salts added to maintain a constant pH during the polymerization of the vinyl halide such as sodium bicarbonate, sodium meta silicate and the like may be employed as may be very small amounts of substances which accelerate or catalyze the polymerization reaction such as complex heavy metal salts or other heavy metal systems, for example, sodium ferri pyrophosphate, ferrous ferric lactophosphate and the like. Substances which improve the stability or the electrical properties of the polymer such as lead acetate may also be incorporated in the polymerization batch before polymerization if desired. Moreover, the initiators of this invention which are reducing agents may be used together with the common initiators which are oxidizing agents such as dibenzoyl peroxide and the like, the result being that the polymerization reaction is carried out in a short time while desirable products are produced.

As one embodiment of this invention 1 g. of sulfur dioxide is dissolved in 100 g. of monomeric vinyl chloride and the solution is emulsified with 250 c. c. of a 2% aqueous solution of myristic acid which is 85% neutralized. 1 g. of sodium ferri pyrophosphate is added to the emulsion and the emulsion is polymerized for 64 hours at 40° C. A 75% yield of a white, fine powdered, high molecular weight polymer is obtained.

The polymeric products obtained from polymerizations of vinyl halides using the initiators of this invention possess a very high molecular weight, are only slightly soluble in ordinary solvents such as acetone or methyl ethyl ketone but may be plasticized with non-volatile solvents such as tricresyl phosphate to yield a very strong, highly resistant, resilient material which is useful in the manufacture of electrical insulation, in coating fabrics and in a large number of other uses.

Although the invention has been specifically disclosed in a representative embodiment, it is not intended to limit the invention thereto for many variations and modifications are within the spirit and scope of the invention as defined in the appended claims.

I claim:

1. The process which comprises subjecting a monomeric material selected from the class consisting of vinyl halides and mixtures of vinyl halides with lesser amounts of vinyl esters, to polymerization in aqueous emulsion in the presence of less than 5% by weight based on the monomeric material of a polymerization initiator consisting of a water soluble inorganic compound containing both sulfur and oxygen and in which the sulfur has a valence no greater than four, and a catalytic amount of a polymerization catalyst consisting of a water-soluble complex iron salt.

2. The process which comprises polymerizing vinyl chloride in aqueous emulsion in the presence of less than 5% by weight based on the vinyl chloride of a polymerization initiator consisting of a water-soluble inorganic compound containing both sulfur and oxygen and in which the sulfur has a valence no greater than four, and a catalytic amount of a polymerization catalyst consisting of a complex water-soluble iron salt.

3. The process of claim 2 in which the polymerization initiator is sulfur dioxide.

4. The process of claim 2 in which the polymerization initiator is a water-soluble sulfite.

5. The process of claim 2 in which the polymerization initiator is sulfur dioxide and the polymerization catalyst is sodium ferri pyrophosphate.

6. The process of claim 2 in which the polymerization initiator is a water-soluble sulfite and the polymerization catalyst is sodium ferri pyrophosphate.

CHARLES F. FRYLING.